INVENTOR.
HAROLD B. DE BENEDETTI
BY
Owen, Wickersham & Erickson
ATTORNEYS 3,198,590
DETERMINATION OF THE STATE OF LUBRICATED BEARINGS FOR ROTATING SHAFTS
Harold B. De Benedetti, Concord, Calif., assignor to Tidewater Oil Company, Los Angeles, Calif., a corporation of Delaware
Filed July 24, 1963, Ser. No. 297,426
5 Claims. (Cl. 308—126)

This invention relates to housed, lubricated bearings for rotating shafts and more specifically to a combination by which the state of such bearings can be determined during operation thereof by a method provided by this invention.

This invention does not relate to the bearings for internal combustion engines, which run quite hot, but it does relate to both anti-friction bearings and journal bearings that normally run at temperatures below about 500° F., typically 175° to 200° F., and are lubricated by oil.

Since bearings operate within housings, they are not accessible to view or study. Heretofore, short of disassembly of the housing and removal of the bearings, it has been difficult to tell the condition of the bearings until they finally burn out, usually doing damage to the shaft so that replacement became a difficult job.

Wear of the bearings may begin with very minor problems—a piece of grit or a chip or a little rust in the races, or a slight misalignment of the balls, for example. Then heat develops, the situation becomes worse, the heat and wear accelerate, and soon the bearings burn out. Unless the trouble is detected soon, the bearings may stick and the shaft may rotate within them, wearing rapidly and often resulting in very serious complications that make it difficult even to replace the shaft. The bearings could be replaced in an hour or two if it was known that they were on the verge of causing trouble, but when the shaft has to be reground because of the bearings burning out before the trouble is detected, it may take a day or two of emergency work to repair the machine, and in the meantime a whole plant may be shut down.

I have found that the visual appearance of the bearings' lubricating oil is affected markedly and rapidly by the state of the bearings, and I have found a novel combination enabling visual inspection of the critical oil at all times, so that the state of the bearings can be known at all times by frequent observation.

Particular relationships are involved and numerous advantages achieved, including that of prolonging the life of the shaft and of the rest of the machine and that of showing when the bearings or their lubricant needs replacing or other action. These and other objects of the invention will be better understood after considering the following description of a preferred embodiment of the invention.

Figure 1:
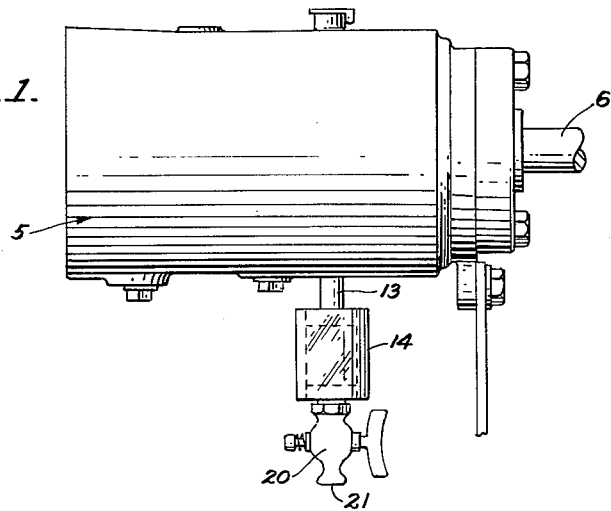
FIG. 1 is a view in elevation of a bearing housing and shaft in a combination incorporating the principles of the invention, the shaft being broken off to conserve space.
Figure 2:
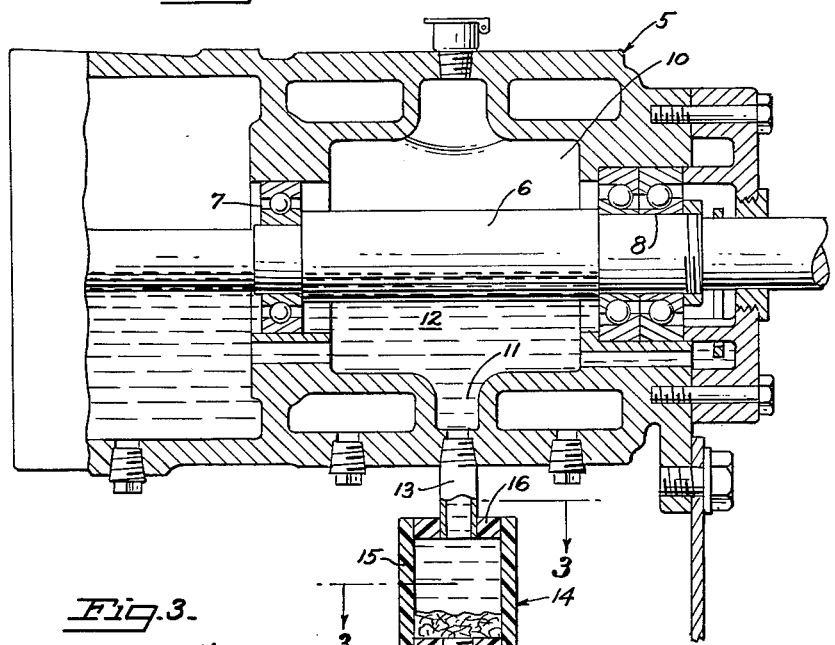
FIG. 2 is an enlarged view in elevation and in section of the same.
Figure 3:
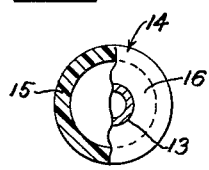
FIG. 3 is a view in section taken along the line 3—3 in FIG. 2.

A bearing housing 5 encloses a shaft 6 which runs in bearings 7 and 8, typically anti-friction bearings though they may be journal bearings. Between the bearings 7 and 8 the housing 5 provides a lubricant reservoir 10 having a sump 11, which holds the lubricant 12 for the bearings 7 and 8. Bearing housings 5 like this are used with many of the pumps used in oil refineries, in compressors, generators, turbines, electric motors, and in many other places, and they are often exposed to the elements outdoors with no protection, subject to the various atmospheric conditions, so that rain falls on them and heat and cold vary widely. It may be noted that to make one of the walls of the housing 5 transparent would not enable adequate study of the conditions of the bearings 7 and 8 nor of the lubricant 12, because, for one reason, there is no way to obtain adequate illumination for such observation. Usually, the lubricating oil is an S.A.E. 20 or 30 oil, though it may be thinner or thicker, from about 10 to 40 S.A.E., and usually it runs at about 200 F. or cooler, a temperature having little degrading effect on the oil. (This condition is to be contrasted with the condition in an internal-combustion engine, where the heat is constantly tending to degrade the oil.)

In my invention, I attach to the very bottom of the sump 11 a suitable pipe fitting 13, about two inches long at the most, which leads to a novel collecting reservoir 14 that is completely transparent (having a cylindrical transparent wall 15 and two disc-like transparent end walls 16 and 17) so that it can be seen through and so that it passes the full illumination coming from sunlight or other available light source. Preferably, the reservoir 14 is cylindrical and is as simple as possible. Also, I prefer for it to be made from clear acrylic plastic. The reservoir 14 is small relative to the volume of oil used in lubricating the bearings and is larger in diameter than the pipe 13 so that lubricant 12 and any material it may carry can collect therein. Typically, the reservoir 14 has a volume of about one to three ounces. Preferably, the reservoir is provided at its lower end with a downwardly extending pipe 18 leading to a suitable closure such as a petcock type of valve 20 having a drain outlet 21.

A very important thing is the diameter of the pipe 13 leading from the bearing chamber sump 11 to the reservoir 14. The pipe 13 must be big enough in diameter to enable the circulation of lubricant 12 down into the reservoir 14 and back up again; otherwise the viscous lubricant 12, once introduced into the reservoir 14, tends to stay, to become stagnant and to exclude the passage of lubricant and contained material from the sump, so that it might be hours before the condition of the bearings 7 and 8 is betrayed by the lubricant 12 in the reservoir. For example, in a typical oil refinery pump the use of heavy so-called "quarter-inch" pipe (about 0.3" inner diameter) achieved no useful purpose whatever, whereas heavy so-called "three-eighths-inch" pipe (about 3/8" inner diameter) made it possible to know the bearing conditions accurately and without substantial time lag. Thus, there must be a conduit 13 large enough to assure a good exchange of the lubricant between the sump 11 and the reservoir 14, and I have found the minimum pipe size here to be an actual inner diameter of about 3/8". Of course, solid particles and water and other heavier materials naturally settle down to the bottom and do not tend to be exchanged, but the important thing is for the lubricant 12 to circulate.

I have found that many conditions can be detected by this simple yet practical apparatus. Under normal conditions the oil 12 seen in the reservoir appears clear, homogeneous, uniform and without foreign matter; and its clarity can be observed from many feet away, because of the illumination directly through the reservoir 14 from all sides.

Thus, when free water collects, the water may sink to the bottom of the reservoir 14 and remain there. This condition is not only observable: the invention also provides for removal of this potentially harmful water from the chamber 10 and thereby protects the bearings 7 and 8 and the shaft 6. Such water is readily detectable as a separate layer with a clear interface between the layers. Once observed and noted, the water that has collected may be drained out by opening the petcock 20 enough to let the water out through the outlet 21, then closing the petcock 20 to keep the oil inside. A warning is given to the operator to locate and eliminate the source of the water.

If it is entering with the supply of oil, the oil should be changed and water-free oil used. If it is entering because rain is getting into the pump housing 5 or from other sources, corrective measures can be taken. The point is that the condition is made clear and visible for anyone to see, and that the water can be drained away by briefly opening the petcock 20.

A more dangerous condition is indicated when the oil in the reservoir 14 exhibits a cloudy condition: this indicates a water-in-oil emulsion. There may also be a water deposit at the bottom with an interface. Such an emulsion cannot do a good lubricating job and it can soon rust the bearings, leading soon to abrasion and burned-out bearings. With my invention, the presence of the emulsion is detectable by the cloudy appearance of the oil in the transparent reservoir 14, and the operator can usually avoid further trouble simply by changing the oil. He should also determine whether to take other corrective steps to avoid emulsions in the future.

Sometimes, however, a water-oil emulsion has done damage before the oil is changed: the bearings may already be beginning to rust. Before my invention, such trouble would lead to burned out bearings. However, a very important feature of this invention is that it enables an observer to know whether water has been reaching the bearings to such an extent that it has rusted them. This condition can be detected instantly by a reddish color imparted to the oil by the rust particles. The oil may be fresh, the water-oil emulsion having been discarded. If the bearings become rusty, rust particles descend into the reservoir 14, and they do so, usually, within minutes. Being heavy, they tend to become concentrated there where the resultant change of color is quite noticeable, for a casual inspection, even at a distance, shows that the oil has become reddish. Then it is time to take remedial action. A simple change of the bearings can avoid further trouble.

One of the most surprising things about the invention is the discovery that a hot bearing makes the oil show a very dark color. Apparently the reason for this is that a hot bearing subjects the oil to cracking or other thermal decomposition. The hot temperature may cause a certain amount of coking of the oil while also causing other types of deterioration due to the production of lighter, less lubricity-imparting elements. The lighter elements may remain in the chamber 10 on top of the oil 12 therein, but the coking or carbonization results in the formation of black coke or carbon particles which descend into the inspection reservoir 14 and with the oil in inspection reservoir 14 thus considerably darkened, the operator knows that there is a hot bearing. Then something must be done, and the point is, that it can be done before destruction of the shaft or other critical portions of the machine. Whereas heretofore burned out bearings were common in one section of a refinery to which this invention applied, with several occurring each year and each necessitating a major replacement operation, usually taking several days, with this invention in effect the hot bearings have been detected at an early stage and simple replacement made in only an hour or so. The machinery then operates for many months quite satisfactorily, with the oil remaining clear.

Thus, the color and state of the oil in the reservoir 14 indicate the state of the bearings. This very important discovery, and the apparatus of this invention, enable one to make observations during operation of the pump or other device, so that a practically continuous watch can be kept in the area over scores of pumps or other devices, and maintenance expense thereby significantly reduced.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A bearing assembly comprising a shaft, bearings for said shaft, a bearing housing enclosing said shaft and bearings and providing a lubricant chamber having a sump, lubricating oil in said chamber, said bearings being during normal operation cooler than 500° F., and means for enabling visual observation to determine the state of the bearings and of its lubricant, said means comprising a transparent cylindrical reservoir positioned beneath said sump and a conduit connecting said reservoir to said sump and enabling circulation of said oil between said reservoir and said sump.

2. The assembly of claim 1 wherein there is a petcock valve and drain conduit leading out from the bottom of said reservoir.

3. A bearing assembly comprising a shaft, bearings for said shaft, a bearing housing enclosing said shaft and bearings and providing a lubricant chamber having a sump, lubricating oil of 10 to 40 S.A.E. viscosity in said chamber, said bearings being during normal operation cooler than 500° F., and means for enabling visual observation to determine the state of the bearings and of its lubricant, said means comprising a transparent cylindrical reservoir, much smaller than the quantity of oil in said chamber, positioned beneath said sump and a conduit at least ⅜″ in inside diameter connecting said reservoir to said sump.

4. The assembly of claim 1 wherein there is a petcock valve and drain conduit leading out from the bottom of said reservoir.

5. A bearing assembly comprising a shaft, bearings for said shaft, a bearing housing enclosing said shaft and bearings and providing a lubricant chamber having a sump, lubricating oil of 10 to 40 S.A.E. viscosity in said chamber, said bearings during normal operation operating at about 200° F., and means for enabling visual observation to determine the state of the bearings and of its lubricant, said means comprising a transparent cylindrical acrylic reservoir of one to three ounce capacity positioned beneath said sump and a conduit at least ⅜″ in inside diameter and no longer than two inches long connecting said reservoir to said sump, and a petcock valve and a drain conduit leading out from the bottom of said reservoir.

References Cited by the Examiner

UNITED STATES PATENTS

| | | | |
|---|---|---|---|
| 2,199,728 | 5/40 | Overson | 116—117 |
| 2,678,623 | 5/54 | Rainsford | 115—117 |
| 2,803,961 | 8/57 | Harmon | 73—118 |

ROBERT C. RIORDON, *Primary Examiner.*

FRANK SUSKO, *Examiner.*